Patented Aug. 14, 1923.

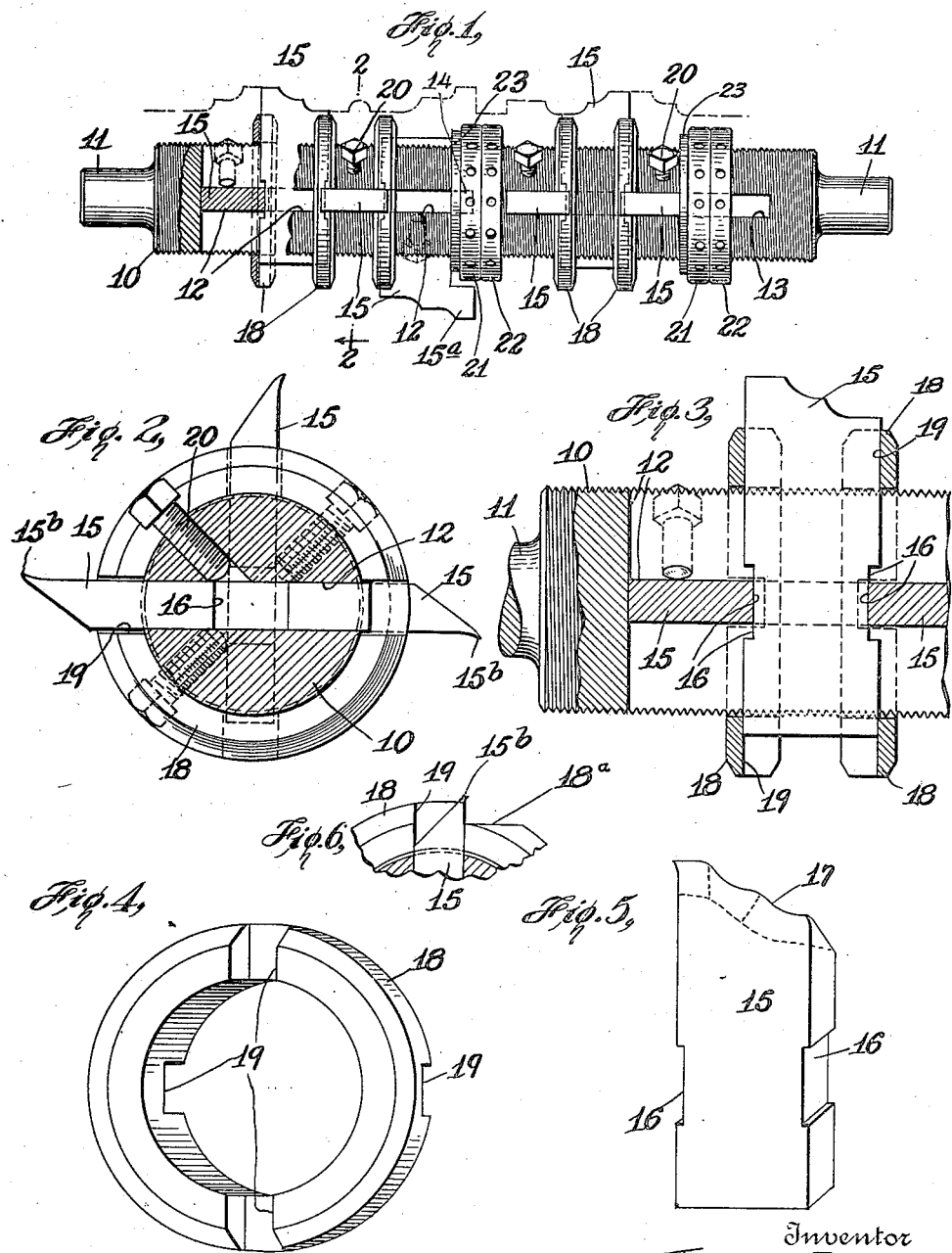

1,465,059

UNITED STATES PATENT OFFICE.

JAMES ROCK, OF ASTORIA, NEW YORK.

TOOL-SUPPORTING SPINDLE FOR WOODWORKING MACHINES.

Application filed May 15, 1922. Serial No. 560,869.

*To all whom it may concern:*

Be it known that I, JAMES ROCK, a citizen of the United States, and residing at Astoria, L. I., in the county of Queens and State of New York, have invented certain new and useful Improvements in Tool-Supporting Spindles for Woodworking Machines, of which the following is a specification, such as will enable those skilled in the art to which it appertains to make and use the same.

This invention relates to woodworking machines and particularly to the tool supporting spindles thereof, and the object of the invention is to provide an improved spindle of this class which is so constructed as to permit of the mounting of a number of cutter blades in connection therewith, and the cutting edges of which extend radially from the axis of said spindle; a further object being to provide means mounted on the spindle and located between the separate cutter blades thereof for reinforcing said cutter blades; a further object being to provide means for temporarily retaining said cutter blades in predetermined positions; a further object being to provide means whereby accidental detachment of the cutter blades from the spindle is obviated; a still further object being to provide means for retaining said cutter blades and other parts in predetermined position; and with these and other objects in view the invention consists in a tool supporting spindle of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of my improved spindle showing a number of cutter blades mounted in connection therewith with parts of the construction broken away and in section;

Fig. 2 a partial section on the line 2—2 of Fig. 1 and on an enlarged scale;

Fig. 3 a view similar to Fig. 1 but showing only a part of the construction and on an enlarged scale;

Fig. 4 a perspective detail view of a spacing ring and reinforcing member which I employ; and, Fig. 5 a perspective detail view of one of a number of cutter blades or tools; and, Fig. 6 a detail view showing a modification.

In the drawing I have shown at 10 my improved spindle provided at its opposite ends with suitable shanks 11 to permit of its mounting in a woodworking or other turning machine, and the spindle 10 is threaded throughout its entire length and is provided at the opposite end portions thereof with two sets of radial apertures 12 and 13, each set of apertures crossing through the axis of the spindle at right angles, and the separate sets of apertures being spaced apart centrally of the spindle as shown at 14.

By providing the two sets of apertures, I may mount a number of cutter blades or tools 15, one of which is shown in Fig. 5 of the drawing, in connection with the spindle 10 to extend radially therefrom in four different positions ninety degrees to each other, and these blades or tools are preferably mounted to extend alternately ninety degrees apart from the spindle to form of all of the blades or tools mounted in connection with the spindle, a spiral arrangement or formation on the spindle, this will be clearly understood on a consideration of Fig. 1 in which the first tool mounted in connection with the left hand end portion of the spindle is directed backwardly, the next tool is directed upwardly, the next tool is directed forwardly and the next tool is directed downwardly, etc.

In Fig. 1 of the drawing, I have shown four tools or blades 15 mounted in connection with the set of apertures 12, while three tools or blades are shown mounted in connection with the apertures 13.

The opposite side edges of the tools or blades 15 are provided with recesses 16 whereby when the separate blades are mounted in the sets of apertures 12—13, the adjacent or abutting edges thereof are interlocked one with another to prevent the movement of said blades radially from the spindle in the event of the loosening of the securing means for such blades or tools. The method of interlocking the separate blades or tools is clearly shown in Fig. 3 of the drawing. It will be noted that the recesses 16 are of greater dimensions than the width of the blades or tools employed to permit of the adjustment of said blades in the spindle to bring the cutting edges 17 of the blades or tools in proper position.

I also employ a number of reinforcing and spacing rings 18, one of which is shown in detail in Fig. 4 of the drawing, and these rings are located between the abutting edges of the blades or tools employed, and are provided on opposite side faces with notches or recesses 19 adapted to receive the shanks of said blades or tools to reinforce the projecting portions of said blades or tools, as will be apparent. The periphery of the rings 18 also serve to form stops for the workpiece in feeding the wood strip toward the blades or tools of the spindle in order to limit the depth of the cut in such workpiece. I also employ a number of set screws 20 which are adapted to operate in connection with the blades or tools and retain the same in predetermined positions of adjustment in assembling or mounting the tools in connection with the spindle, and I also employ two nuts 21 and 22 which are in threaded engagement with the spindle 10 and are provided for the purpose of retaining all of the blades or tools 15 as well as the rings 18 in predetermined positions.

In Fig. 1 of the drawing, I have shown two sets of the nuts 21 and 22, one set being adapted to hold the blades or tools 15 and rings 18 that are mounted in the apertures 12 in position, while the other set of said nuts retain the blades or tools and rings in the apertures 13 of the spindle.

In assembling the blades or tools in the spindle, one of said blades or tools is placed in one of the apertures 12 and retained in the desired position of adjustment by the set screw 20 cooperating with said blade, after which one of the rings 18 is mounted in position to engage said blade and another blade is placed in position and at right angles to the first named blade and retained in position by the set screw for said blade, after which another of the rings 18 is mounted in position and this operation is repeated until the desired number of blades have been mounted in the apertures 12 of the spindle, after which the nuts 21 and 22 are moved into operative position to firmly retain the blades and rings in position and a washer 23 is preferably employed between the nut 21 and blade or tool adjacent thereto, and if it be desired the blades 15 and rings 18 may also be mounted in the apertures 13 of the spindle in the same manner and retained in position by the other set of nuts 21 and 22, and a washer 23 will also be employed as shown in Fig. 1.

It will be apparent that when seven of the tools are mounted in connection with the spindle, as shown in Fig. 1, a comparatively wide molding or other workpiece strip is to be operated upon and the cutter blades or tools will be so positioned on the spindle to cut a predetermined contour in the workpiece or strip as indicated in dot and dash lines in Fig. 1 of the drawing. It will be understood that any number of the tools may be employed and said tools may be mounted in connection with either set of apertures 12—13 and may be secured in position in any desired manner. By providing the set screws 20, as shown in the drawing, they may also serve for the purpose of retaining balancing slugs in connection with the spindle, in which event, the slugs will be mounted between the heads of said screws and the periphery of the spindle but, in view of the method of mounting the cutter blades or tools in connection with the spindle it may be found to be unnecessary to do this.

It will also be apparent on a consideration of Fig. 1 of the drawing that the tool or blade adjacent to the nuts 21 and 22 may extend over the periphery of the nuts as shown at $15^a$ in Fig. 1 of the drawing to cut the workpiece at this point but this is not absolutely necessary.

It will also be noted that the cutting edges of the tools employed are preferably turned slightly in the direction of the plain face of the tool as shown at $15^b$ in Fig. 2 of the drawing to facilitate the operation of cutting a predetermined contour in a workpiece.

It will be apparent that while I have shown certain details of construction for carrying my invention into effect that I am not necessarily limited to these details, and various changes in and modifications of the construction herein shown and described may be made, within the scope of the appended claims, without departing from the spirit of my invention or sacrificing its advantages.

In Fig. 6 of the drawing I have shown a part of one of the spacing rings 18 and have shown a slight modification in the form of said ring in which the periphery or outer face of the ring is cut away, as shown at $18^a$ at one side of one or more of the recesses 19 in said ring so that in the operation of the tools 15, the shavings of the workpiece may fall into the cut away portion $18^a$ of the rings 18.

It will also be understood that where the rings 18 serve as stop members for limiting the inward movement of the workpiece that the tools or cutter blades 15, or the cutting edges $15^b$ thereof are practically flush with the periphery of said stop rings 18 or only project slightly therefrom.

Having fully described my invention, what I claim as new and desire to secure by Letters Patent, is:—

1. A tool supporting spindle of the class described, said spindle being threaded throughout its entire length, the opposite end portions of said spindle being provided with apertures arranged at right angles to each other and extending radially through the axis of the spindle, tools adapted to be mounted in the apertures of said spindle and to extend from said spindle in a ninety degree relation to each other, means whereby said tools may be interlocked one with another, means for adjustably securing said tools in the apertures of said spindle, and nuts adjustably mounted on said spindle for retaining said tools in predetermined positions.

2. A tool supporting spindle of the class described, said spindle being threaded throughout its entire length, the opposite end portions of said spindle being provided with apertures arranged at right angles to each other and extending radially through the axis of the spindle, tools adapted to be mounted in the apertures of said spindle and to extend from said spindle in a ninety degree relation to each other, means whereby said tools may be interlocked one with another, means for adjustably securing said tools in the apertures of said spindle, nuts adjustably mounted on said spindle for retaining said tools in predetermined positions, and rings mounted on said spindle and adapted to be located between the adjacent faces of the tools mounted therein and in connection with which said tools interlock for reinforcing said tools.

3. A tool supporting spindle of the class described, said spindle being threaded throughout its length and provided with apertures extending radially through the axis thereof and at right angles to each other, and in which tools are adapted to be placed, means for adjustably retaining said tools in the apertures of said spindle, and means for holding all of said tools in predetermined positions of adjustment.

4. A tool supporting spindle of the class described, said spindle being threaded throughout its length and provided with apertures extending radially through the axis thereof and at right angles to each other, and in which tools are adapted to be placed, means for adjustably retaining said tools in the apertures of said spindle, and means for holding all of said tools in predetermined positions of adjustment, said last named means comprising members in threaded engagement with said shaft and capable of movement longitudinally thereof.

5. A tool supporting spindle of the class described, said spindle being threaded throughout its length and provided with apertures extending radially through the axis thereof and at right angles to each other, and in which tools are adapted to be placed, means for adjustably retaining said tools in the apertures of said spindle, means for holding all of said tools in predetermined positions of adjustment, said last named means comprising members in threaded engagement with said shaft and capable of movement longitudinally thereof, and means for reinforcing and interlocking the tools mounted in said spindle where they abut.

6. A tool supporting spindle of the class described, said spindle being threaded substantially the entire length thereof, said spindle being provided with spaced apertures arranged at right angles to each other and extending radially through the axis thereof and adapted to receive suitable tools, and means in threaded engagement with said shaft for retaining tools mounted in said apertures in predetermined position.

7. A tool supporting spindle of the class described, said spindle being threaded substantially the entire length thereof, said spindle being provided with spaced apertures arranged at right angles to each other and extending radially through the axis thereof and adapted to receive suitable tools, means in threaded engagement with said shaft for retaining tools mounted in said apertures in predetermined position, and means whereby the tools may be interlocked one with another.

8. A tool supporting spindle of the class described, said spindle being threaded substantially the entire length thereof, said spindle being provided with spaced apertures arranged at right angles to each other and extending radially through the axis thereof and adapted to receive suitable tools, means in threaded engagement with said shaft for retaining tools mounted in said apertures in predetermined position, means whereby the tools may be interlocked one with another, and means for adjustably securing said tools in the apertures of said spindle.

9. A tool supporting spindle of the class described, said spindle being provided with apertures extending radially through the axis thereof and at angles to each other and in which tools are adapted to be placed, adjustable means mounted in the spindle in juxtaposition to and cooperating with the apertures thereof for adjustably retaining tools mounted in said apertures in predetermined positions, rings movably mounted on said spindles and cooperating with adjacent tools for reinforcing and interlocking said tools and other means adjustably mounted on said spindle for retaining all of said tools and said rings in predetermined positions.

10. A tool supporting spindle of the class described, said spindle being provided with apertures extending radially through the axis thereof and at angles to each other and in which tools are adapted to be placed, adjustable means mounted on the spindle in juxtaposition to and cooperating with the apertures thereof for adjustably retaining tools mounted in said apertures in predetermined positions, rings movably mounted on said spindles and cooperating with adjacent tools for reinforcing and interlocking said tools and other means adjustably mounted on said spindle for retaining all of said tools and said rings in predetermined positions, and means cooperating with said last named means for locking the same in predetermined positions.

11. A tool supporting spindle of the class described, said spindle being provided with apertures extending radially through the axis thereof and at angles to each other and in which tools are adapted to be placed, adjustable means mounted on the spindle in juxtaposition to and cooperating with the apertures thereof for adjustably retaining tools mounted in said apertures in predetermined positions, rings movably mounted on said spindles and cooperating with adjacent tools for reinforcing and interlocking said tools and other means adjustably mounted on said spindle for retaining all of said tools and said rings in predetermined positions, means cooperating with said last named means for locking the same in predetermined positions, and means for interlocking the adjacent faces of the separate tools employed one with another.

In testimony that I claim the foregoing as my invention I have signed my name this 12th day of May, 1922.

JAMES ROCK.